United States Patent [19]

Mestre et al.

[11] 4,081,263
[45] Mar. 28, 1978

[54] METHOD AND APPARATUS FOR BENDING A SHEET OF VITREOUS MATERIAL

[75] Inventors: Pierre Mestre, Maubeuge; José Payen, Assevent, both of France

[73] Assignee: BFG Glassgroup, Paris, France

[21] Appl. No.: 758,919

[22] Filed: Jan. 13, 1977

[30] Foreign Application Priority Data

Jan. 14, 1976 France .................. 76 00824

[51] Int. Cl.² ............................ C03B 23/02
[52] U.S. Cl. ...................... 65/106; 65/273; 65/289
[58] Field of Search ............ 65/103, 104, 106, 273, 65/275, 288, 289, 107

[56] References Cited

U.S. PATENT DOCUMENTS

| 2,111,392 | 3/1938 | Galey | 65/273 |
| 2,215,228 | 9/1940 | Oliver | 65/107 |

FOREIGN PATENT DOCUMENTS

| 544,602 | 8/1957 | Canada | 65/107 |

*Primary Examiner*—Arthur D. Kellogg
*Attorney, Agent, or Firm*—Cushman, Darby & Cushman

[57] ABSTRACT

A method of bending a sheet of vitreous material wherein the sheet is heated and caused to bend relative to a contacting reaction means by initiating the bending of the sheet while it is in contact with the reaction means and separating the sheet and reaction means before completion of the bending operation, and apparatus for carrying out such method which is preferably incorporated in a sheet bending plant as a mobile track-mounted unit therein.

27 Claims, 25 Drawing Figures

METHOD AND APPARATUS FOR BENDING A SHEET OF VITREOUS MATERIAL

The present invention relates to a method of bending a sheet of vitreous material wherein the sheet is heated and caused to bend relative to a contacting reaction means. The invention includes apparatus for bending a vitreous sheet while it is in heated condition and a sheet bending plant incorporating such apparatus, and extends to a vitreous sheet bent by the method of the invention.

The invention is particularly concerned with the bending of flat sheets, but may also be applied to the bending of previously curved sheets.

Bending of flat vitreous sheets permits the manufacture of products having considerable commercial interest, and in fact considerably enlarges the domain of use of flat glass products.

For certain uses, such as in certain curved shop windows or in the so-called panoramic vehicle windscreens, the desired radius of curvature of the vitreous sheet is relatively large. Such products can be made by adapting traditional glass-forming methods, for example by allowing the vitreous sheet to sag over a solid mold or framework, or by pressing between male and female formers of the required shape.

Such methods as have previously been proposed suffer from the disadvantage that the curvature imparted to the sheet is dependent on the shape of the mold or framework over which the sheet is allowed to sag.

It is the principal object of the present invention to provide an alternative method of bending vitreous sheets in which the actual curvature imparted by such bending is not directly linked to the shape of the mold or framework.

According to the present invention, there is provided a method of bending a sheet of vitreous material wherein the sheet is heated and caused to bend relative to a contacting reaction means by initiating the bending of the sheet while it is in contact with the reaction means and separating the sheet and said reaction means before completion of the bending operation.

Initiating bending of the sheet while it is in contact with the reaction means enables the location of the bend formed to be fixed in the desired place, and because the sheet is separated from such reaction means before the bending operation is completed there is no longer the practical consequence that the bent sheet must conform to the shape of the reaction means.

Preferably, the bending operation folds the sheet at one or more places. The advantages of the invention are particularly apparent when folding a vitreous sheet, that is, when bending such a sheet to a radius of curvature which is small in comparison with the sheet dimension measured perpendicular to the line of the fold.

Advantageously, the viscosity of the vitreous material at the or each folding place is below and the viscosity of the vitreous material in the remainder of the sheet is above $10^{11.5}$ poises throughout the bending operation. These conditions further promote good results when folding sheets, and in particular, they allow a flat sheet to be folded in such a way that the leaves thereof to either side of a fold line can remain substantially as they were before such folding, for example they can remain flat.

Preferably, bending forces are applied to margins of leaves of the sheet. This reduces the risk that the main faces of the bent sheet will be marred in an unacceptable way by the member or members applying such forces. Furthermore, the margins will in general be cooler and therefore more resistant to marking than other parts of the sheet, and also, some slight marginal marking might be acceptable whereas a similar marking toward the center of the sheet would not be. This feature also allows the forces to be applied to the sheet as far away as is possible from the reaction means. This allows a higher bending moment to be achieved for a given force, so that bending can be speeded up or the applied force reduced.

Advantageously, following separation, the sheet is supported only at its edges or margins. This further reduces the risk of damaging a central portion of a main face of the sheet. Indeed, by applying bending forces and supporting a sheet at its edges or margins alone, a further advantage may be apparent in that it is possible to achieve a sharp bend or fold at a relatively low temperature.

Preferably, in the course of bending of the sheet, supporting forces are applied to the edges or margins, which forces cause separation of the sheet from the reaction means as bending proceeds. This is a very convenient way of effecting support and separation of a sheet from the reaction means as the sheet is being bent.

In preferred embodiments of the invention, the reaction means comprises a bar having a convexly curved reaction face, and the bending operation forms a sheet fold with a radius of curvature smaller than the radius of curvature of the reaction face. This is a very convenient, practical way of imparting a sharp fold to the sheet. In fact, by performing the invention in this way it is possible for the sheet to be bent to form at least one fold having a radius of curvature of at most 10cm, which is desirable in some circumstances. Also, a larger bar can be used, so that the reaction forces exerted thereby on the sheet before separation will be spread over a greater sheet area, thus reducing the risk that the sheet will be marred at the fold line.

Preferably, the sheet is heated to reduce the viscosity of the vitreous material at each bending place to $5 \times 10^9$ poises or less. This allows bending to proceed more rapidly, which is obviously desirable for commercial production.

Advantageously, the viscosity of the vitreous material at each bending place of the sheet is kept above $2.5 \times 10^8$ poises at least until the separation has been effected. In fact, by adopting this feature it is possible to reduce the risk of marking the sheet by the reaction means even further.

Preferably, the sheet is thermally tempered after bending. This enables the sheet to be toughened in an economical way, and is especially desirable if the sheet is to be used to form a vehicle windscreen.

The invention includes apparatus for bending a vitreous sheet while it is in heated condition, and according to the present invention the apparatus comprises reaction means for contacting a sheet at one or more places to allow bending of the sheet relative to the reaction means. Opposed force exerting members are disposed abreast of the reaction means and means is provided for effecting a relative approach movement of the force exerting members for applying bending forces on opposed margins of the sheet to cause bending each place. Opposed sheet supporting members are provided for supporting the sheet abreast of each place during the bending, at least one of the supporting members being displaceable relative to the reaction means to bring about separation of the sheet from the reaction means during the relative approach movement of the force exerting members. This is a very convenient apparatus for putting into effect the method according to the invention.

Preferably, the force applying members and the sheet supporting members are carried by opposed arms which are pivotally mounted abreast of the reaction means. This is an extremely simple apparatus for exerting bending forces on the vitreous sheet to be bent. Advantageously, each of the arms is mounted for pivotal movement about an axis whose position is so related to the position of the reaction means that the separation is effected by pivotal movement of the arms. This allows automatic separation of the sheet from the reaction means after the desired initial amount of bending has taken place.

Preferably, the arms pivot downwardly for applyint the bending forces. In this case, the bending forces can simply be due to the weight of the arms and any members carried thereby, and the requirement for any extraneous force exerting means is eliminated. Advantageously, the arms are in the form of stirrups adapted to accommodate opposed end portions of a sheet. The stirrups provide force exerting members for bearing against a main face of the sheet and supporting members for contacting the end edge faces of the sheet. This is a very stable form of apparatus. Moreover, since the supporting members are arranged to contact the end edge faces of the sheet, they will not mark the main faces of the sheet.

In some preferred embodiments of the invention, means is provided which is operatively connected to at least one of the arms and causes displacement of the reaction means away from the sheet during the application of bending forces. This is one way of effecting the separation of the sheet and reaction means. In some cases, that is when the sheet is also moved away from the original position of the reaction means, this feature will have the effect of increasing the separation which may be desirable. This feature is particularly valuable, however, in cases where the reaction means is constituted as a pair of reaction members, for example, for bending the sheet into a square U-shape. In such cases, the reaction members can be moved toward one another away from the sides of the U-shape.

Preferably, the reaction means is displaceable away from the sheet along a guideway and at least one of the arms has a displacing member which displaces the reaction means along the guideway during pivotal movement of the arms. This is a particularly simple way of insuring reliable displacement of the reaction means.

Advantageously, each reaction means is a bar for determining a place where the sheet can be folded. This enables a sharp bend or fold to be formed. Preferably, each bar is a hollow cylindrical bar. Such a bar can be mounted loosely on a shaft, and the risk that it will mar the surface of a sheet during bending is reduced.

The reaction means should clearly be refractory so that it will be able to withstand the temperature to which it will be subjected during bending of a sheet, and it is particularly suitable to coat such reaction means with silica. Preferably, the force exerting members and the supporting members are constituted as toothed bars. Advantageously, abutment means is provided arranged to abut against a sheet to limit bending thereof. This is an extremely simple way of insuring that a sheet is bent to the required amount.

Preferably, means is provided for differentially heating a sheet. Such heating means is preferably arranged to heat the sheet to above its dilatometric softening point ($5 \times 10^9$ poises) at the place or places where it is to be bent, while maintaining the remainder of the sheet below such dilatometric softening point but at a temperature which is sufficiently high that the sheet will not be subjected to thermal shock which would involve serious risk of breakage.

Apparatus according to the invention can with advantage be incorporated in a vitreous sheet bending plant, and the invention includes such a plant which incorporates a track leading through one or more stations at which a sheet can be subjected to heating and bending operations, and which further incorporates bending apparatus as herein defined which is in the form of a mobile bending unit which is displaceable along said track.

Preferably, such a bending plant includes at least one mobile bending unit, and the track leads through a plurality of work stations comprising in succession: a sheet loading station at which a sheet can be loaded onto a unit; a heating and bending station wherein the heating and bending operations take place; a further heating station including heating means adapted to heat a bent sheet uniformly; a tempering station including one or more blowers for cooling a uniformly heated bent sheet to effect thermal tempering thereof; a cooling station for cooling a tempered sheet; and a sheet unloading station.

Advantageously, the track is a rectangular circuit, and each mobile bending unit is arranged to travel between such further heating station and said tempering station in a direction which is generally parallel to the axis or axes about which a sheet carried by that unit is bent. This allows a mobile bending unit to pass directly from its unloading station to its loading station so that a higher production throughput can be achieved, and it also allows the tempering process to start very quickly after the sheet has left such further heating station.

Preferably, each mobile bending unit is arranged to bend a sheet carried thereby to a predetermined shape, and the tempering station comprises upper and lower air boxes respectively complementary in shape to the upper and lower faces of a sheet bent to the predetermined shape, and means for raising and lowering the air boxes. This enables air to be blown all over the sheet from a uniform distance, thus promoting uniform cooling of the sheet surfaces and therefore uniform tempering of the sheet, and the adoption of this feature also makes it possible for a tempered sheet to leave the tempering station in a direction at right angles to the direction from which it entered such station.

The invention includes a vitreous sheet bent by a method as herein defined.

Other features and advantages of the invention will appear from the following where preferred embodiments are described by way of example with reference to the accompanying drawings in which.

Figure 1:
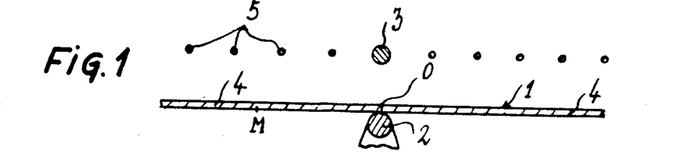
FIGS. 1 to 3 are schematic views illustrating different stages in the process according to the invention.
Figure 2:
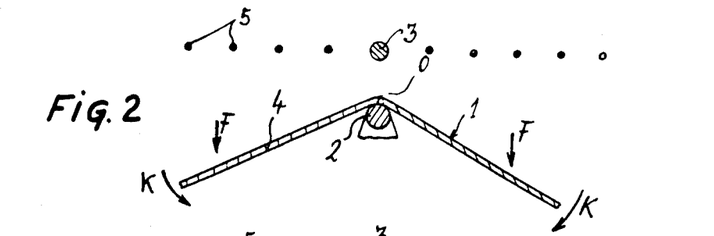
Figure 3:
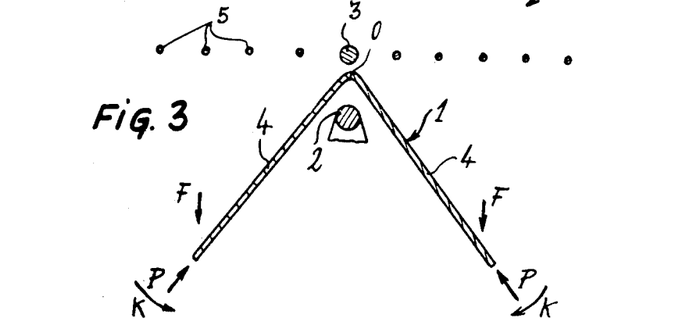

With reference to FIGS. 1 to 3, the process for bending a vitreous sheet, indicated at 1, into a V-shape comprises the following stages:

In a first stage (FIG. 1) the vitreous sheet 1 is arranged on reaction means 2 beneath heating means, such as a heating tube 3, to assure local heating of a strip of the vitreous material at a bending place on the reaction means 2.

In a second stage (FIG. 2) bending forces, represented by the arrows F are applied to the sheet 1. When the vitreous material at the heated bending place reaches its softening temperature, the bending forces cause the sheet to bend about a line O which is the line of contact between the sheet 1 and the reaction means 2, leaves 4 of the sheet pivoting in directions K. During this second stage, the vitreous material in the leaves 4 of the sheet to either side of the line O is at a temperature below the softening point of the material so that the bending forces applied will not engender any deformation of these leaves.

In a third stage (FIG. 3) bending of the vitreous sheet 1 continues and supporting forces P directed in the plane of each face 4 toward the bending line O, or having a component so directed, are applied to the edges or margins of the leaves 4 of the sheet.

The application of the supporting forces P has the following effects:

(1) the vitreous sheet 1 is raised relative to the reaction means 2.
(2) the locally heated strip of the sheet approaches the heating tube 3, which at the same time raises the temperature in that strip and reduces the size of the effective zone of operation of the heating means.

It has surprisingly been found that these effects can give a reduction in the radius of curvature of the fold without causing deformation of the leaves 4 of the sheet.

Further, by virtue of the separation of the internal surface of the fold in the sheet from the reaction means 2, marking of the sheet by that means can be avoided.

If the vitreous sheet 1 to be bent is of ordinary soda-lime glass, it is necessary also to heat the leaves 4 of the sheet using heating means such as 5 in such a way that the energy absorbed by these leaves per unit area in a given time is lower than that absorbed by the strip which is locally heated by the heating tube 3. In this way, the temperature gradient between the bending line O and the leaves 4 is reduced and consequently so is the thermal shock which might otherwise tend to break the sheet. Of course the leaves 4 of the sheet 1 must always remain below the dilatometric softening point of the vitreous material if they are not to be deformed by the bending forces F or supporting forces P.

In the case where the bent vitreous sheet 1 is to be toughened by thermal tempering, it is necessary to heat the vitreous material to its softening point before subjecting it to rapid cooling by blowing air. In this case it is necessary to re-heat the vitreous sheet after the bending, that is to say when there are no further bending forces applied to the leaves 4. At the time of rapid cooling, it is imperative that the vitreous material should be at a substantially homogeneous temperature. Thermal gradients in the sheet at the time of blowing air will inevitably induce stresses which will cause deformation or breakage of the sheet 1. This stage of temperature equalization, necessary when the bent sheet is to be thermally tempered, is also advantageous in the case where it is desired to produce a correctly annealed vitreous product so that the residue of permanent stresses in the plane or thickness of the sheet shall be relatively small.

In order to render uniform the temperature of the vitreous sheet after bending, it is necessary to apply heat to the cooler leaves 4 to bring these to the softening temperature and allow the sheet to cool gently, or at least to reduce the effects of the local heating at the bending place. In practice, this application of heat is effected by transferring the bent vitreous sheet beneath heating means to equalize the temperature of the leaves 4 and the locally heated strip of the sheet.

Figure 4:
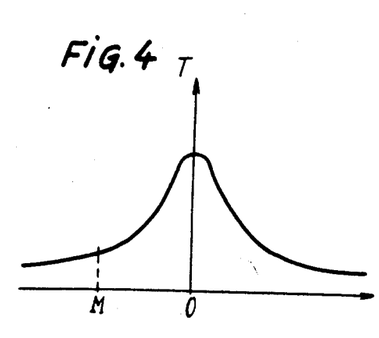
FIG. 4 is a graph showing a temperature gradient along a sheet of vitreous material being bent according to the invention.

FIG. 4 shows the temperature gradient in the vitreous material to either side of the bending line O. This curve is of Gaussian form whose profile is determined by the power and concentration of the heating means 3. Thus, the locally heated strip to either side of the bending means will be narrower the more concentrated is the action of the heating means.

Figure 5:
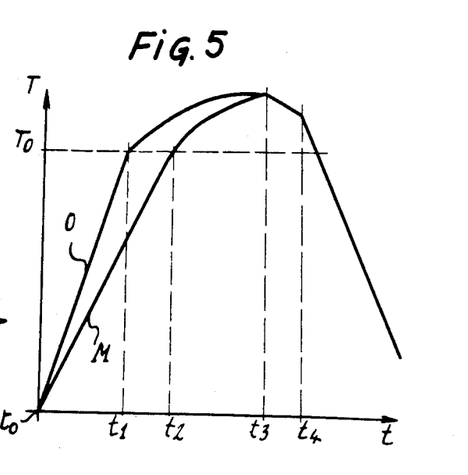
FIG. 5 is a graph showing how the temperature at two points along a sheet varies in time during a process according to the invention.

FIG. 5 shows, as a function of time $t$, the variation in the temperature of the vitreous material at a point on the bending line O and at a point M located on one of the leaves 4 of the sheet 1 in the case where a bending operation is followed by a tempering operation.

One finds successively:

At time $t_0$, the start of heating. The speeds of heating of the vitreous material at O and M are different.

At time $t_1$, the point situated on the bending line O first reaches the dilatometric softening temperature $T_O$ of the vitreous material, and the viscosity of the vitreous material there decreases rapidly. Bending commences, slowly at first and then more quickly.

At time $t_2$, the point M has reached the dilatometric softening temperature $T_O$. To avoid deformation of the leaves 4 of the vitreous sheet, no further bending forces may be applied. The bending must have been finished, and in certain cases, the leaves 4 of the sheet should be supported at the end of the bending.

At time $t_3$, the curves showing the temperatures at the bending line O and at the point M have come together after a temperature equalization stage which has brought the sheet to a temperature near the softening point as is necessary for tempering treatment involving air cooling.

At time $t_4$, rapid cooling commences.

A successful outcome of the bending operation depends on good control of the heating means 3 and 5 so that for points on the bending line O and the point M, the temperatures vary according to the graph of FIG. 5.

In particular, the radius of curvature of the vitreous sheet 1 will be shorter and the leaves 4 will be flatter when the difference in viscosity between points on the bending line O and the point M is greater and when the locally heated strip is narrower. This implies that the heating means 3 used to perform the local heating should be powerful and of concentrated effect.

An apparatus for applying such a process to bend or fold to V-shape a rectangular flat glass sheet will now be described.

Figures 6, 7, 16:
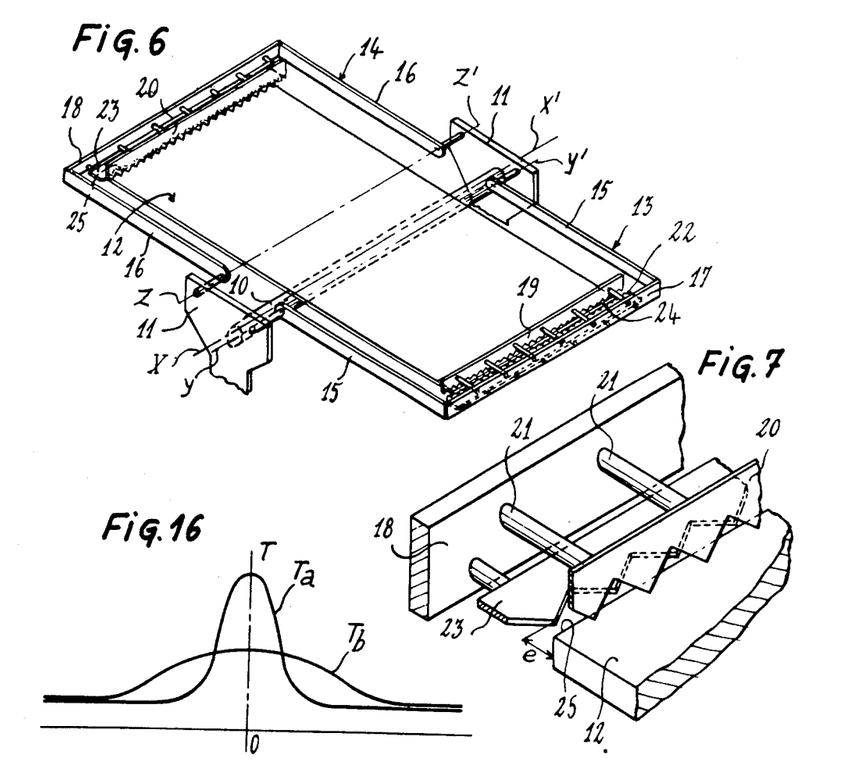
FIG. 6 is a perspective view of an apparatus according to the invention arranged to fold a flat vitreous sheet into V-shape.
FIG. 7 is a detail view to larger scale of part of the apparatus of FIG. 6.
FIG. 16 is a graph showing temperature gradients along sheets of vitreous material being bent on reaction bars having different diameters.

In the embodiment shown in FIG. 6, the apparatus comprises a reaction bar 10 constituted by a cylinder fixed transversely between two plates 11 fast with a frame (not shown). The rectangular sheet of glass 12 is laid horizontally on the reaction bar 10. The line of contact XX' between the bar 10 and the sheet 12 defines the place at which the sheet will be bent.

The apparatus also includes force applying means pivotally mounted at axes YY' and ZZ' above and on opposite sides of the line XX'. In this example the force applying means are constituted as two stirrups 13, 14, of general U-shape. The free ends of the arms 15, 16 of these stirrups are respectively pivotally mounted at the axes YY' and ZZ'. Portions 17, 18 forming the bases of the stirrups 13, 14, which run parallel to the axes, carry members for applying bending forces to opposite end margins of the glass sheet 12.

In the embodiment shown, these force-applying members are constituted as toothed bars 19, 20, running parallel with the bases 17, 18 of the stirrups. The teeth of these bars rest on the upper face of the sheet 12. The toothed bars 19, 20 are fixed to the above bases 17, 18 of the stirrups by struts 21 (see FIG. 7). The bases 17, 18 of the stirrups 13, 14 also carry second bars 22, 23 having teeth directed towards the opposite end edge faces 24, 25 of the glass sheet. The teeth of the bars 22, 23 are thus perpendicular to the teeth of the bars 19, 20.

As will be seen from FIG. 7, the ends of the teeth of the bar 23 (or 22) are located at a distance $e$ from the adjacent end edge face 25 (or 24) of the glass sheet 12. This distance $e$ is regulated so that the teeth of the bars 22, 23 come into contact with the edges 24, 25 of the sheet during the course of the bending to support the sheet as will be described in more detail with reference to FIGS. 8 to 11.

Figure 8:
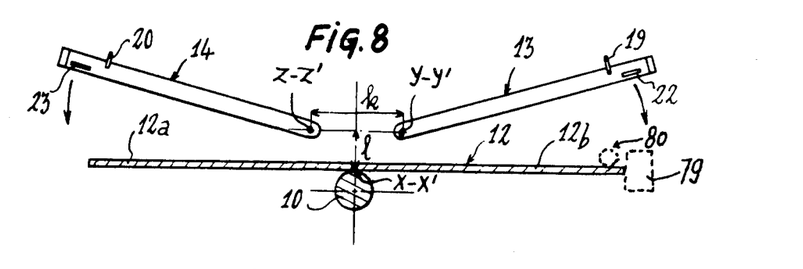
FIGS. 8 to 11 are schematic views showing the apparatus of FIG. 6 in different stages of the process.

The flat glass sheet 12 is laid on the fixed reaction bar 10 so that the line of contact XX' corresponds with the place where it is desired to bend the sheet. For this positioning, the stirrups 13, 14 are raised (FIG. 8).

Figure 9:
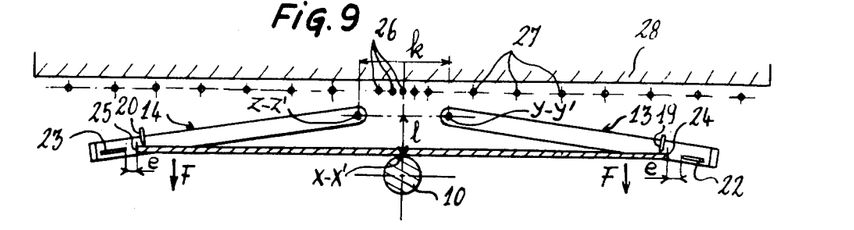

Once the glass sheet is in place, the stirrups 13, 14 are lowered so that the teeth of the force-applying bars 19, 20 rest on the upper face of the sheet 12 along its opposite end margins (FIG. 9). The glass sheet 12 is then stabilized in horizontal equilibrium. The stirrups 13, 14 exert downwardly directed forces F on the end margins of the sheet 12. At this stage, the teeth of the sheet support bars 22, 23 are not in contact with the sheet. They are separated from the ends of the sheet by a distance $e$.

The bending unit carrying the glass sheet is then placed in appropriate manner beneath heating elements 26, 27 and is adjusted in position so that the heating elements 26 are in register with the line XX' of contact between the sheet 12 and the reaction bar 10. The heating elements 26, 27 are arranged in two networks, the heating elements 27 being arranged in a homogeneous network for uniformly heating the whole of the sheet, and the heating elements 26 being arranged in a non-homogeneous network for locally heating a narrow strip across the glass. A refractory roof 28 above the heating elements 26, 27 acts as a reflector.

Figure 10:
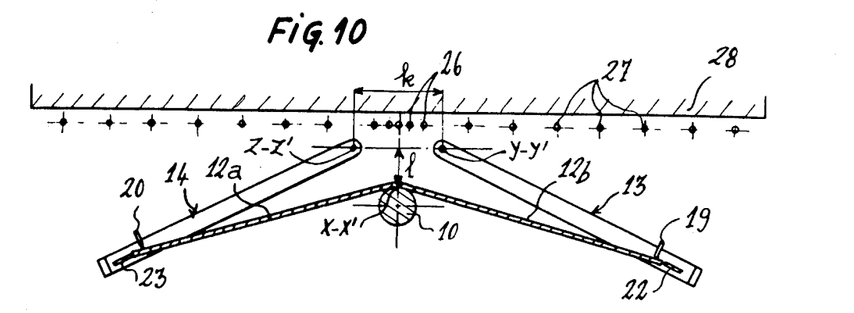

When the glass in the narrow strip reaches the dilatometric softening temperature, the leaves 12a, 12b of the sheet 12 situated to either side of the reaction bar 10 will sag under the action of their own weight and the weight of the stirrups 13, 14 which apply bending forces to the sheet via the toothed bars 19, 20 (FIG. 10). The stirrups 13, 14 follow the sheet during its bending by pivoting on their axes YY', ZZ'. Because of the arrangement of the apparatus, in particular because the axes YY' and ZZ' are a distance $k$ apart symmetrically to either side of, and a distance $l$ above, the line XX', the teeth of the sheet support bars 22, 23 come into contact with the edges 24, 25 of the sheet during the course of this pivotal movement.

Figure 11:
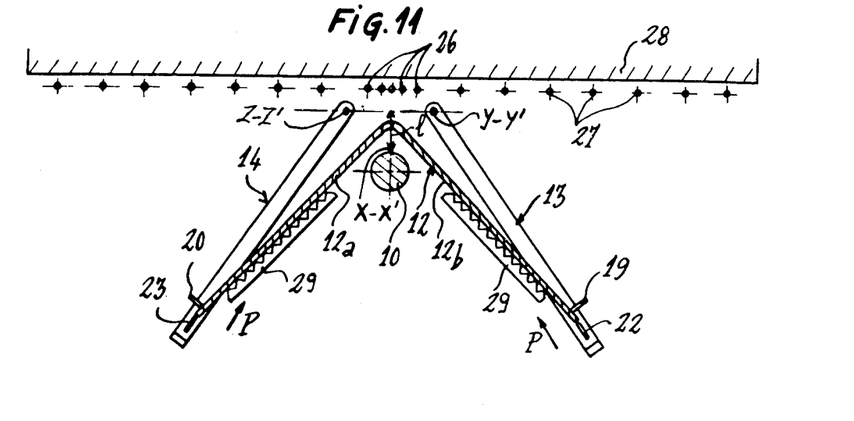
Figure 12:
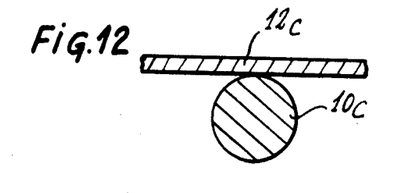
FIGS. 12 to 15 are schematic views showing the influence of the diameter of the reaction bar of the apparatus on the radius of curvature of a vitreous sheet bent according to the invention.
Figure 13:
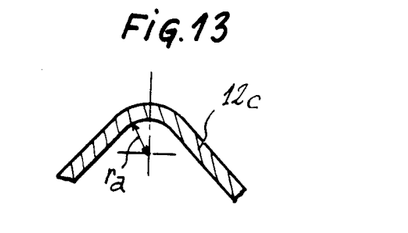
Figure 14:
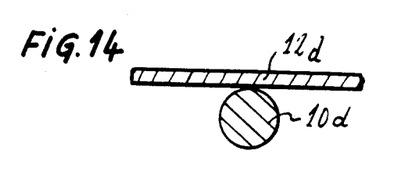
Figure 15:
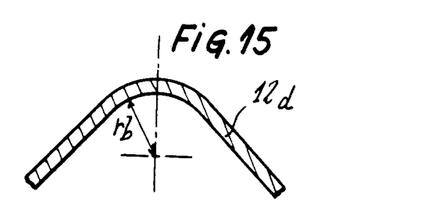

Continuation of the heating gives rise to further sagging of the two leaves of the sheet which simultaneously closes the fold angle and raises the glass sheet by virtue of the forces P exerted by the sheet support bars 22, 23. From this time, the sheet 12 no longer rests on the reaction bar 10 (FIG. 11). Raising of the sheet 12 is accompanied by approach of the locally heated strip, i.e., the bending place, toward the heating elements 26. On the other hand, sagging of the sheet to either side of the fold line entails movement of the leaves of the sheet away from the heating elements, and inclination with respect to the heat radiation. These effects combine to give rise to a considerable intensification of the thermal gradient across the sheet and consequently, in a very favorable way, establish a strong variation in the viscosity of the glass at the edge of the bending place. As a result of this arrangement, it is possible to achieve very small radii of curvature.

The reaction bar 10 which supports the sheet at the start of the bending operation is placed in register with the local strip heating elements 26. This reaction bar 10 thus is also submitted to the local heating and makes a notable contribution to local heating of the glass by radiation and conduction of a portion of its absorbed heat energy. This explains why the shape and material of the reaction bar 10 are not totally without influence on the progress of the bending operation and on the results achieved.

A cylindrical form of reaction bar 10 insures contact with a glass sheet 12 along a line. If the reaction bar is provided with a refractory mantle (as will be described below), this contact will be made along a narrow strip whose width will be a function of the effect of squashing of the mantle due to the weight of the glass sheet augmented by the weight of the stirrups 13, 14 resting on it; the width of the contact strip will affect heat exchange between the reaction bar and the sheet.

Another important factor which can significantly affect the spread of the local heating is the diameter of the reaction bar 10. Paradoxically, a greater diameter leads to a smaller radius of curvature for a bent sheet. FIGS. 12 to 15 show that a reaction bar 10c having a greater diameter than a bar 10d will lead to a radius of curvature $r_a$ for a sheet 12c which is smaller than the radius of curvature $r_b$ of the sheet 12d. The temperature profile across the sheets (FIG. 16) at the movement of bending shows that the reaction bar 10c has had a much greater thermal effect on the glass (the peak of the curve $T_a$ is higher and narrower than that of the curve $T_b$).

The sheet of glass 12 and the reaction bar 10 are rapidly heated by the local heating elements 26. The line of contact XX' is particularly exposed because it is at the center of the local heating, the bar is opaque and it is screened from cooling. There is thus a considerable risk that the reaction bar 10 will leave an imprint on the lower surface of the glass sheet 12 when it has reached softening temperature. Rapid separation of the sheet from the reaction bar after bending has commenced should therefore take place, before the surface of the glass has softened sufficiently to be marked. The gap $e$ between the ends 24, 25 of the sheet and the sheet support bars 22, 23 should therefore be small so that this separation is effected quickly. Once separated from the reaction bar 10, the hottest zone of the sheet, i.e., the bending place, is out of all physical contact.

On the other hand, for good control of the operation, separation of the sheet and the reaction bar 10 should not take place too soon, so that the thermal effect of the bar on the sheet has time to become established.

The parameters which govern operation of the bonding are thus:

(1) the structure and thermal power of the local heating elements 26,
(2) the structure of the reaction means 10 and its distance from the heating elements 26,
(3) the initial gap $e$ between the sheet support bars 22, 23 and the end edge faces 24, 25 of the sheet,
(4) the separation $k$ of the pivot axes YY' and ZZ' and their height 1 above the level of the contact line XX',
(5) the thickness and the nature of the vitreous material, and
(6) the initial forces exerted by the stirrups 13, 14 on the vitreous sheet.

At the start of bending, the reaction of the bar 10 on the sheet 12 is a vertical reaction along the line XX', the force applying bars 19, 20 pressing along lines on the sheet parallel to the contact line XX' and close to the extreme ends of the sheet. Under these conditions, the maximum bending moment is applied to the line XX' and it is this moment which initiates the bending.

As soon as the toothed support bars 22, 23 come into contact with the end edge faces 24, 25 of the sheet and separate it from the reaction bar 10, this pattern of forces is completely altered. The supporting forces $p$ exerted by the support bars 22, 23 are substantially in the plane of the flat leaves 12a, 12b. This arrangement is particularly favorable for transmitting bending forces without deforming the leaves 12a, 12b.

To effect thermal tempering, the whole surface of the bent sheet 12 should be accessible to the blown air. Any object acting to screen off air currents could create zones which would not be subject to rapid cooling. High stresses between these and neighboring zones would appear during the tempering. These stresses could exceed the resistance to breakage of the sheet so that it might shatter during the tempering treatment. Separation of the sheet from the reaction bar is thus a very important advantage during tempering since it allows the cooling air to be blown against the inside of the bend formed.

The toothed form of the force applying bars 19, 20 and the sheet support bars 22, 23 is chosen to reduce marking of the vitreous sheet to a minimum.

In the final temperature equilization stage prior to tempering, the temperature of the whole vitreous sheet is brought close to the softening point of the sheet. For sheets of large area and small thickness there may then be a risk that the leaves 12a, 12b, although flat during bending, will sag under gravity at the end of the operation. To avoid this risk, the apparatus preferably includes abutments against which the leaves of the sheet can rest when the bending is complete. Such abutments are shown in FIG. 11 as toothed bars 29 arranged along margins of the leaves 12a, 12b of the sheet perpendicular to the bending line. The abutment bars 29 can be constituted as end stops for the bending operation and their position may be adjustable to take into account the angle of bending which it is desired to achieve.

Figures 17, 22:
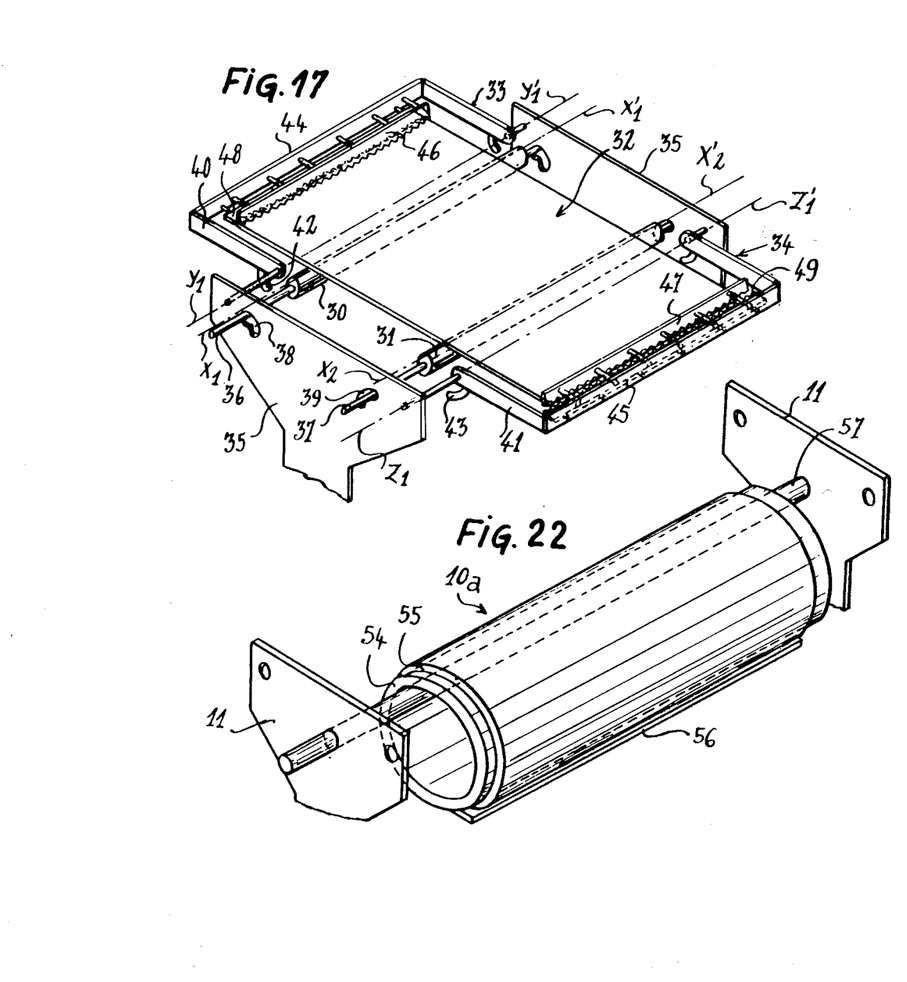
FIG. 17 is a perspective view of an apparatus according to the invention arranged to bend a flat vitreous sheet into a square V-shape.
FIG. 22 is a perspective view of an embodiment of reaction bar for an apparatus according to the invention.
Figure 18:
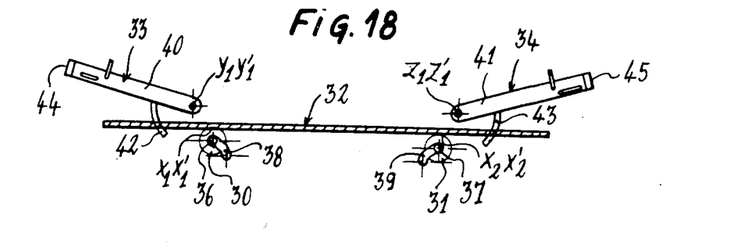
FIGS. 18 to 21 are schematic views showing different stages in a process using the apparatus of FIG. 17.

The apparatus shown in FIG. 17 is an embodiment for bending a sheet to U-shape or square V-shape. The arrangement includes a pair of parallel reaction bars 30, 31 making contact along lines $X_1X'_1$, $X_2X'_2$ with a glass sheet 32 which is to be bent to V-shape along those lines.

The apparatus also includes two stirrups 33, 34 arranged one on each side of the two reaction bars 30, 31 and pivotally mounted at axes $Y_1Y'_1$ and $Z_1Z'_1$ which are parallel to and above the level of the contact lines $X_1X'_1$ and $X_2X'_2$. The pivot axes $Y_1Y'_1$ and $Z_1Z'_1$ are fixed with respect to plates 35 forming part of a frame (not shown).

The reaction bars 30, 31 are supported by rods 36, 37 engaging in guideways 38, 39 in those plates 35. These guideways 38, 39 define for the rods 36, 37 two stable positions in the first of which the rods are spaced apart by the maximum distance and are in a raised position as shown in FIG. 17, and in the second of which the rods are close together in a lower position.

Pivot arms 40, 41 of the stirrups 33, 34 carry arcuate projections 42, 43 arranged to bear against the rods 36, 37 on downward pivotal movement of the stirrups so as to push the rods along their guideways 38, 39 toward the second, i.e. lower, position referred to above. The bases 44, 45 of the stirrups carry force applying bars 46, 47 and sheet support bars 48, 49 identical to those of the V-bending apparatus already described.

Different stages in the operation of the U-bending apparatus are illustrated in FIGS. 18 to 21.

A sheet of glass 32 is laid across the two reaction bars 30, 31. These bars are in their first, raised position with their support rods 36, 37 in the upper parts of their guideways. While placing the glass sheet in position, the stirrups 33, 34 are raised (see FIG. 18).

Figure 19:
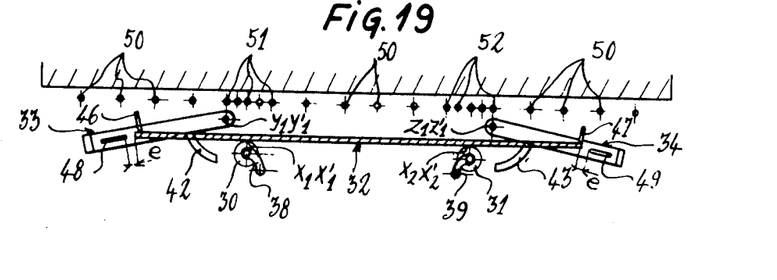

The stirrups are then lowered so that their force applying bars 46, 47 rest on the end margins of the sheet 32 as shown in FIG. 19. At this stage, the sheet support bars 48, 49 are not in contact with the sheet, but are spaced a short distance $e$ from the edges of the sheet as illustrated. The bending unit supporting the glass sheet is then placed in any suitable way beneath heating elements 50, 51, 52 and is adjusted in position so that local strip heating elements 51, 52 are in register with the reaction bars 30, 31. The heating elements 50 are arranged to heat the whole of the sheet.

Figure 20:
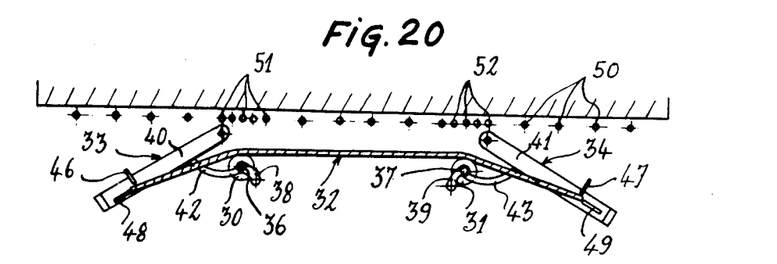

Under the combined action of the local heating and gravity forces due to the weight of the glass and the stirrups 33, 34, leaves of the sheet 32 to either side of the two reaction bars 30, 31 will sag down around them (FIG. 20).

As a result of the consequent pivotal movement of the stirrups 33, 34 and of the spacing of the pivot axes $Y_1$ $Y'_1$ and $Z_1Z'_1$ in relation to the reaction contact lines $X_1X'_1$ and $X_2X'_2$ about which bending commence, the sheet support bars 48, 49 will move into contact with the end faces of the sheet 32.

Figure 21:
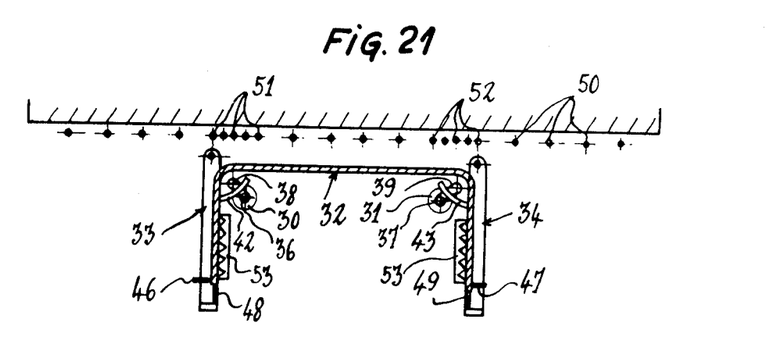

Continuation of the heating will result in the simultaneous closure of the fold angle and separation of the sheet 32, supported by the sheet support bars 48, 49, from the reaction bars 30, 31.

At this stage, the projections 42, 43 fixed to the pivot arms 40, 41 of the stirrups 33, 34 come into contact with the reaction bar support rods 36, 37 and push these toward the lower position in the guideways 38, 39 formed in the plates 35. By this movement, the reaction bars 30, 31, separated from the sheet, leave their upper positions and descend and move toward one another to take up retracted positions.

The retraction of the reaction bars 30, 31 toward the interior of the U-shape formed by the bending operation affords sufficient spacing between them and the glass. By virtue of this arrangement, leaves of the sheet can be bent down through 90° without being restrained by the presence of the reaction bars 30, 31, and the bars no longer present an obstacle close to the sheet surface which would impede air flow during thermal tempering.

At the end of bending, the bent leaves of the sheet 32 come to rest against toothed abutments 53 which define the final shape and position of the sheet.

If the bending operation is chronologically asymmetrical, that is to say if one of the leaves of the sheet sags down before the other, the sheet will for a time take up an inclined position. In particular, the upper part of the U-shape, between the two reaction bars can become inclined to the horizontal. The toothed abutments 53 can be suitably placed to recenter the glass sheet and give it a symmetrical U-form.

Once bent, the sheet can be subjected to uniform heating and transported by suitable means between two air boxes for tempering.

Detailed characteristics of the structure and operation of a V-folding apparatus as illustrated in FIG. 6 will now be described.

EXAMPLE 1

The glass sheet 12 used had a length of 100 cm, a width of 50 cm and a thickness of 5 mm. It was desired to bend this sheet at the middle of its length to produce a dihedral angle of 90° and a radius of curvature measured to the interior of the fold of 50 mm. The bending apparatus used was made entirely of refractory steel.

In this Example, the reaction bar fixed between the two plates 11 comprised, as shown in FIG. 22, a hollow cylindrical tube 54 of refractory steel having an internal diameter of 33 mm, an external diameter of 42 mm and a length of 700 mm. The tube 54 was provided with five layers of a web of pure silica to provide a satisfactory mantle 55 which was 4 mm thick. The silica was held in place by a steel plate 56 fixed to the underside of the tube 54. The cylindrical tube 54 is held in position by a support rod 57 of refractory steel 16 mm in diameter. This rod runs through the tube 54 and is held in two holes in the plates 11.

In this Example, the distances $k$ and $l$ (see FIG. 8) were respectively 120 mm and 13.5 mm.

The toothed force applying bars 19, 20, the toothed sheet support bars 22, 23, and the abutments 29 were of similar construction. They were cut from a stainless steel plate, the teeth being 10 mm high at a pitch of 20 mm.

The force applying bars 19, 20 and the abutments 29 were arranged to contact the sheet 12 along lines 5 mm in from its edges.

The initial space $e$ between the edge faces of the sheets and the sheet support bars 22, 23 was 1 mm. This was measured when cold.

At the start of the heating, the distance between the plane of the sheet and the heating elements 26, 27 (FIGS. 9 to 11) was approximately 70 mm.

In this Example, the heating elements 26 were resistance coils of tungsten filament placed under vacuum in transparent quartz tubes. These tubes had a diameter of 12 mm and a useful length of 700 mm. Each element was rated at 1500 Watts at 250 volts. Under these conditions, the color temperature of the filament was 2,150° K and the peak of the emission spectrum was centered on a wavelength of 1.35 micron. Six of these tubular elements were arranged parallel 15 mm apart to form a panel emitting radiation at its center with a maximum surface energy flux of 14 W/cm$^2$.

Uniform heating of the sheet was effected in a conventional electric furnace.

The principal operating characteristics were as follows:

| | |
|---|---|
| power applied for heating whole sheet: | 25 KW |
| power applied for heating bending place: | 9 KW |
| area of action of local heating elements: | 700 × 75 mm |
| surface energy flux at center of local heating: | 14W/cm$^2$ |
| surface energy flux over remainder of sheet: | 5W/cm$^2$ |
| maximum temperature reached at center of fold: | 705° C |
| mean temperature reached across leaves of sheet: | 635° C |

The durations of the principle phases of the bending operation under these conditions were as follows (see FIG. 5):

| | minutes | seconds |
|---|---|---|
| $t_0$ to $t_1$ from start of heating to start of bending | 3 | 30 |
| $t_1$ to $t_2$ approximate duration of bending | 1 | — |
| $t_2$ to $t_3$ temperature equalization | — | 30 |
| $t_3$ to $t_4$ transfer to tempering station | — | 5 |
| $t_4$ to $t_5$ rapid cooling to effect tempering | — | 35 |

Further Examples of operation in accordance with the invention will now be described. The operating conditions were the same as those of Example 1 except where indicated.

EXAMPLE 2

Distance between the local heating elements 26 and the glass sheet 12: 70 mm.

External diameter of reaction cylinder 10a (FIG. 22) including silica mantle: 50 mm.

| Thickness of glass sheet | 3 mm | 5mm | 8 mm |

-continued

| Radius of curvature obtained | 55 mm | 50 mm | 45 mm |

EXAMPLE 3

Distance between the local heating elements 26 and the glass sheet 12: 70 mm.

External diameter of reaction cylinder 10a including silica mantle: 28 mm.

| Thickness of glass sheet | 3 mm | 5 mm | 8 mm |
| Radius of curvature obtained | 68 mm | 63 mm | 58 mm |

EXAMPLE 4

Distance between the local heating elements 26 and the glass sheet 12: 50 mm.

External diameter of reaction cylinder 10a including silica mantle: 50 mm.

| Thickness of glass sheet | 3 mm | 5 mm | 8 mm |
| Radius of curvature obtained | 25 mm | 22 mm | 18 mm |

From these Examples it is apparent that the radius of curvature obtained paradoxically decreases with increase in the external diameter of the bending bar and with increase in the thickness of the sheets.

The invention will now be further described as applied to a vitreous sheet bending plant.

Figures 23, 24:
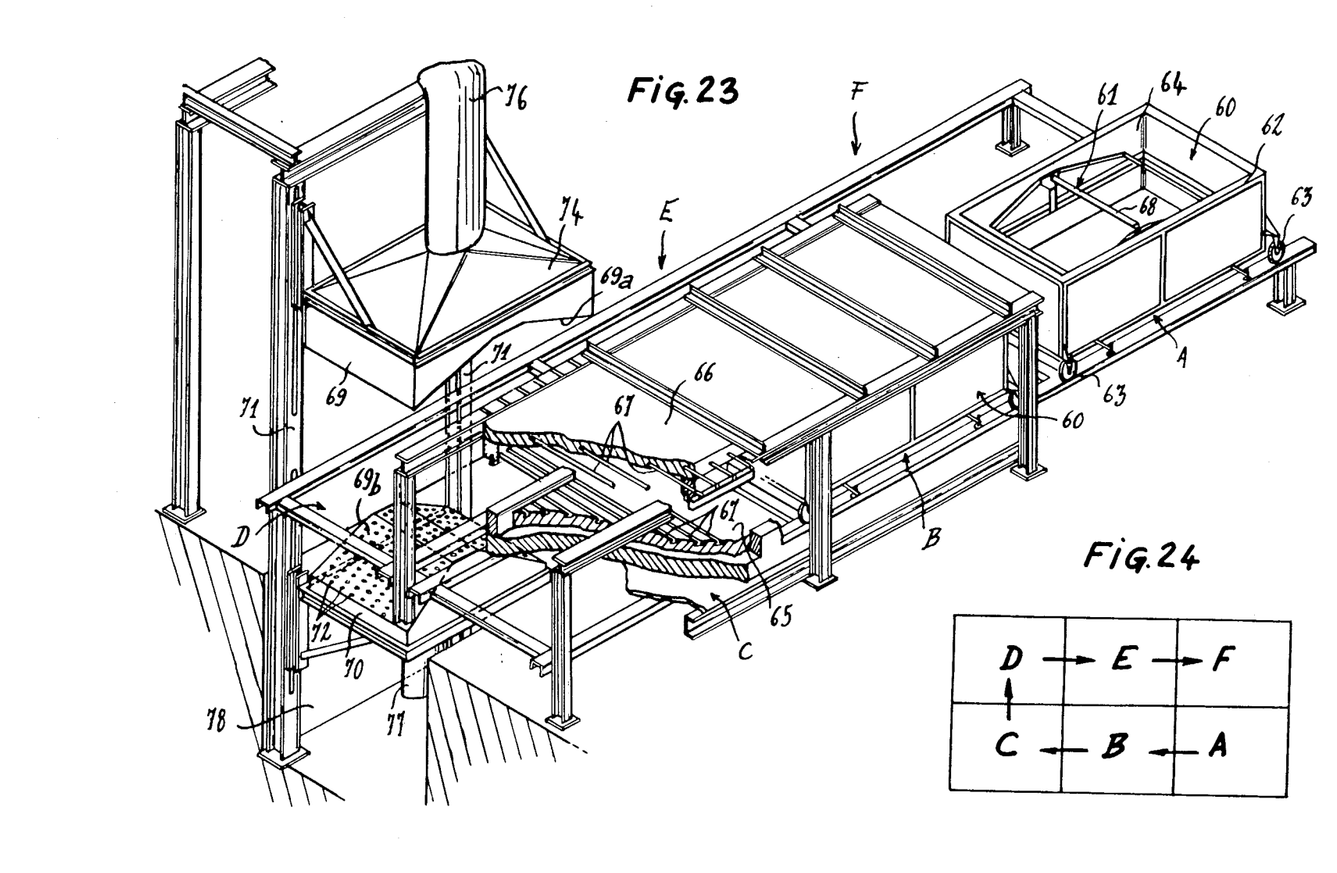
FIG. 23 is a partly cut away perspective view of a vitreous sheet bending plant according to the invention.
FIG. 24 is a diagram showing the various work stations of the bending plant of FIG. 23.

In the embodiment shown in FIG. 23, the bending plant comprises a circuit for mobile bending units 60 each incorporating a bending apparatus 61 according to the invention.

Each mobile bending unit 60 comprises a parallelepipedic box 62, open at the top and bottom, which surrounds the bending apparatus 61 per se and which carries wheels 63 at its base. The side walls 64 of the boxes 62 are advantageously covered on their inner faces with a thermally insulating layer, for example of refractory fibers.

The mobile bending units can be moved around the circuit successively to occupy six work stations. This movement is not continuous, each unit marking time at each work station. The movement of the mobile bending units can be governed mechanically according to a predetermined program.

The six successive work stations through which the mobile bending units pass are as follows (see also FIG. 24):

(A) a sheet loading station where a sheet to be bent can be placed on the bending apparatus 61,
(B) a heating and bending station,
(C) a further heating station for equalizing the temperature of a bent sheet,
(D) a tempering station incorporating air-blowers,
(E) a cooling station which optionally includes force-cooling means, and
(F) a sheet unloading station.

In the embodiment illustrated, the circuit is a rectangular circuit of which one side defines the passage between the temperature equalizing station C and the tempering station D.

At the sheet loading station A, there is free access to the interior of the mobile bending units 60 so that a vitreous sheet can be put into place on the bending apparatus 61.

At stations B and C, each mobile bending unit 60 is between a sole 65 and a roof 66 which take the place of the top and bottom of the box 62. Thus the combination of the box 62, the sole 65 and the roof 66 constitutes a closed chamber. Heating elements 67 are arranged in the sole 65 and roof 66.

In the roof 66, the heating elements can be modulated at will in intensity and position to define uniform heating zones and one or more localized more intense heating zones. In the bending station B, the localized more intense zone is made to register with the reaction means 68 of a mobile bending unit when this is correctly positioned. The heating elements 67 in the sole act as a positive thermal screen to reduce heat loss toward the base, and to avoid too great a difference in temperature between the upper and lower faces of the vitreous sheet.

At the tempering station D, a mobile bending unit 60 carrying a bent vitreous sheet moves between two superposed air boxes 69, 70 for cooling the sheet by blowing air. The blowing surfaces 69a, 69b of the air boxes 69, 70 each present a shape, in this case a dihedral which is complementary to the shape of the bent vitreous sheet (see also FIG. 25). The air boxes 69, 70 are attached to means (not shown) whereby they can be moved toward or away from each other along vertical columns 71 of the bending plant.

Figure 25:
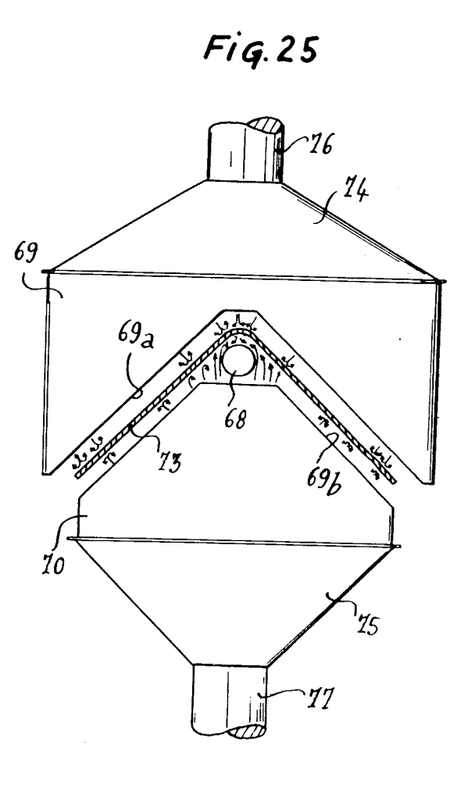
FIG. 25 is a side elevation of the tempering station of the bending plant of FIG. 23.

When a mobile bending unit has entered the tempering station D, the air boxes 69, 70 move toward the bent sheet into the interior of the parallelepipedic box 62. Displacement of the air boxes 69, 70 is arrested when their blowing surface 69a, 69b comprising air holes 72 are a short distance away from the upper and lower faces of the bent sheet 73, as indicated in FIG. 25. The air for blowing is distributed to the upper and lower air boxes 69, 70 by bell-mouths 74, 75 of conduits 76, 77 leading to one or more fans. After blowing, the upper air box 69 is raised and the lower air box 70 is lowered into a trough 78 of the plant.

The mobile bending unit 60 is then moved to the cooling station E, where the bent and tempered sheet is allowed to cool in free air.

At the sheet unloading station F, the bent sheet of vitreous material is removed from the mobile bending unit via the top.

It will be appreciated that the invention is not limited to the embodiments which have just been described. Thus, the invention can equally be performed for bending or folding non planar vitreous sheets. In such cases the apparatus would require to be adapted to the shape of the sheet to be bent. The apparatus described can also be modified. It would, for example, be possible to alter the way in which the mobile bending units advance. In particular, the mobile bending units 60 could be lined up one behind the other so that they advance in the direction of the axes of their reaction bars 68. Also, the bending apparatus 61 can be recycled beside or underneath the track for the mobile bending units 60. The bending plant can be modified to allow continuous movement rather than step-by-step movement of the mobile bending units.

In a variant of the apparatus shown in FIG. 8, the stirrup 13 is replaced by an end stop 79 and an upper reaction stop 80 (both shown in dotted lines). In such a case the stirrup 14 will operate as described to fold the leaf 12a of the sheet 12 downwardly, whereas the end of the leaf 12b will remain stationary. Downward pivoting of the stirrup 14 will still have the effect of separating the sheet 12 from the reaction bar 10, so that when bending is complete, the leaf 12b will be slightly inclined to the horizontal.

In a second variant, the toothed sheet edge support bars 22, 23 are replaced by pincers gripping end margins of the sheet, and the sheet is bent against a reaction bar located above it so that the bend line forms a trough as opposed to a crest as shown.

In a further embodiment, the sheet is heated uniformly and bent so that it has substantially the same radius of curvature along its entire length.

What is claimed is:

1. A method of bending a sheet of vitreous material which comprises the steps of heating the sheet, and causing the sheet to bend relative to a contacting reaction means by initiating the bending of the sheet while it is in contact with said reaction means and then separating the sheet and said reaction means before completion of the bending operation.

2. A method as defined in claim 1, wherein said bending operation folds the sheet at one or more places.

3. A method as defined in claim 2, wherein the viscosity of the vitreous material at the folding place is below and the viscosity of the vitreous material in the remainder of the sheet is above $10^{11.5}$ poises throughout the bending operation.

4. A method as defined in claim 2, wherein the bending forces are applied to margins of leaves of the sheet.

5. A method as defined in claim 2 wherein following said separation, the sheet is supported only at its edges or margins.

6. A method as defined in claim 5, wherein supporting forces are applied to said edges or margins in the course of bending of the sheet, which supporting forces cause separation of the sheet from said reaction means as bending proceeds.

7. A method as defined in claim 2 wherein said reaction means comprises a bar having a convexly curved reaction face, and wherein the bending operation forms a sheet fold with a radius of curvature smaller than the radius of curvature of said reaction face.

8. A method as defined in claim 7, wherein said sheet is bent to form at least one fold having a radius of curvature of at most 10 cm.

9. A method as defined in claim 2, wherein said sheet is heated to reduce the viscosity of the vitreous material at the bending place to $5 \times 10^9$ poises or less.

10. A method as defined in claim 2, wherein the viscosity of the vitreous material at the bending place of the sheet is kept above $2.5 \times 10^8$ poises at least until said separation has been effected.

11. A method as defined in claim 2, wherein said sheet is thermally tempered after bending.

12. Apparatus for bending a vitreous sheet while it is in heated condition, comprising reaction means for contacting a sheet at at least one place to allow bending of the sheet relative to said means, opposed force exerting members disposed abreast of said reaction means, means for effecting a relative approach movement of said force exerting members for applying bending forces on opposed margins of the sheet to cause bending at said place, and opposed sheet supporting members for supporting said sheet abreast of said place during said bending, at least one of said supporting members being displaceable relative to said reaction means to bring about separation of said sheet from said reaction means during said relative approach movement of said force exerting members.

13. Apparatus as defined in claim 12, wherein said force applying members and said sheet supporting members are carried by opposed arms which are pivotally mounted abreast of said reaction means.

14. Apparatus as defined in claim 13, wherein each of said arms is mounted for pivotal movement about an axis whose position is so related to the position of said reaction means that said separation is effected by pivotal movement of said arms.

15. Apparatus as defined in claim 14, wherein said arms pivot downwardly for applying said bending forces.

16. Apparatus as defined in claim 13 wherein said arms are in the form of stirrups adapted to accommodate opposed end portions of a sheet, said stirrups providing force exerting members for bearing against a main face of the sheet, said supporting members being operable to contact the end edge faces of the sheet.

17. Apparatus as defined in claim 13 wherein at least one of said arms has means operatively connected thereto for causing displacement of said reaction means away from the sheet during the application of bending forces.

18. Apparatus as defined in claim 17, wherein said reaction means is displaceable away from the sheet along a guideway and at least one of said arms has a displacing member which displaces said reaction means along said guideway during pivotal movement of said arms.

19. Apparatus as defined in claim 12 wherein said reaction means comprises a bar for determining a place where the sheet can be folded.

20. Apparatus as defined in claim 19, wherein said bar is a hollow cylindrical bar.

21. Apparatus as defined in claim 12 wherein said force exerting members and said supporting members comprise toothed bars.

22. Apparatus as defined in claim 12 wherein abutment means is provided arranged to abut against said sheet to limit bending thereof.

23. Apparatus as defined in claim 12 wherein means is provided for differentially heating said sheet.

24. A vitreous sheet bending plant, comprising a track leading through one or more stations at which a sheet can be subjected to heating and bending operations, and bending apparatus in the form of a mobile bending unit displaceable along said track, said mobile bending unit comprising reaction means for contacting a sheet at at least one place to allow bending of the sheet relative to said means, opposed force exerting members disposed abreast of said reaction means, means for effecting a relative approach movement of said force exerting members for applying bending forces on opposed margins of the sheet to cause bending at said place, and opposed sheet supporting members for supporting said sheet abreast of said place during said bending, at least one of said supporting members being displaceable relative to said reaction means to bring about separation of said sheet from said reaction means during said relative approach movement of said force exerting members.

25. A bending plant as defined in claim 24, wherein said track leads through a plurality of work stations comprising in succession; a sheet loading station at which a sheet can be loaded onto said mobile bending unit; a heating and bending station at which the heating and bending operations take place; a further heating station including heating means adapted to heat a bent sheet uniformly; a tempering station including one or more blowers for cooling a uniformly heated bent sheet to effect thermal tempering thereof; a cooling station for cooling a tempered sheet; and a sheet unloading station.

26. A bending plant as defined in claim 25 wherein said track is a rectangular circuit and said mobile bending unit is arranged to travel between said further heating station and said tempering station in a direction which is generally parallel to the axis about which a sheet carried by that unit is bent.

27. A bending plant as defined in claim 25 wherein said mobile bending unit is arranged to bend a sheet carried thereby to a predetermined shape and in that said tempering station comprises upper and lower air boxes respectively complementary in shape to the upper and lower faces of a sheet bent to said predetermined shape, and means for raising and lowering said air boxes.

* * * * *